(12) United States Patent
Nambiar et al.

(10) Patent No.: US 9,100,242 B2
(45) Date of Patent: Aug. 4, 2015

(54) SYSTEM AND METHOD FOR MAINTAINING CAPTIVE PORTAL USER AUTHENTICATION

(71) Applicant: Aruba Networks, Inc., Sunnyvale, CA (US)

(72) Inventors: Brijesh Nambiar, Sunnyvale, CA (US); George Voon, San Jose, CA (US); Ravinder Verma, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 8 days.

(21) Appl. No.: 14/018,129

(22) Filed: Sep. 4, 2013

(65) Prior Publication Data

US 2014/0157376 A1    Jun. 5, 2014

Related U.S. Application Data

(60) Provisional application No. 61/732,829, filed on Dec. 3, 2012.

(51) Int. Cl.

| H04L 9/32 | (2006.01) |
|---|---|
| H04L 29/06 | (2006.01) |
| H04L 12/801 | (2013.01) |
| H04L 12/745 | (2013.01) |
| H04L 12/773 | (2013.01) |
| H04L 12/841 | (2013.01) |
| H04L 12/803 | (2013.01) |

(52) U.S. Cl.
CPC .......... *H04L 29/06217* (2013.01); *H04L 45/60* (2013.01); *H04L 45/748* (2013.01); *H04L 47/11* (2013.01); *H04L 47/28* (2013.01); *H04L 63/0272* (2013.01); *H04L 63/101* (2013.01); *H04L 63/20* (2013.01); *H04L 47/122* (2013.01)

(58) Field of Classification Search
CPC ......... H04L 63/08; H04L 63/10; H04L 63/20; H04L 63/0272; H04L 63/101; H04L 47/122; H04L 47/28; H04L 29/06217; H04L 47/11; H04L 45/748; H04L 45/60; G06F 21/31; G06F 21/35; G06F 21/43
USPC .............. 726/1–7, 27–30; 713/168–170, 193; 380/270; 709/225, 229
See application file for complete search history.

(56) References Cited

U.S. PATENT DOCUMENTS

| 7,505,434 B1 * | 3/2009 | Backes ......................... 370/331 |
| 7,913,294 B1 * | 3/2011 | Maufer et al. .................... 726/3 |
| 7,971,621 B2 * | 7/2011 | Rogalla et al. ............... 157/1.17 |

(Continued)

OTHER PUBLICATIONS

Final Office Action of Feb. 25, 2015 for U.S. Appl. No. 13/439,730, 17 pages.

*Primary Examiner* — Hosuk Song

(57) ABSTRACT

The present disclosure discloses a method and network device for maintaining captive portal user authentication. Specifically, the disclosed system determines an association status between a client and an access point in a wireless network, as well as whether to remove an entry corresponding to the client from a network layer (L3) cache based on the association status. If it is determined that the entry is to be removed, the disclosed system removes the entry corresponding to the client from the network layer (L3) cache. Note that, the association status can be determined based on one or more of an indication by a station management process at the network device, and a detection of radio link activities.

21 Claims, 6 Drawing Sheets

(56) References Cited

U.S. PATENT DOCUMENTS

| | | |
|---|---|---|
| 2003/0229665 A1 | 12/2003 | Ryman |
| 2007/0100967 A1 | 5/2007 | Smith et al. |
| 2007/0214265 A1 | 9/2007 | Zampiello et al. |
| 2010/0095359 A1 | 4/2010 | Gordon |
| 2010/0235513 A1 | 9/2010 | Baffier et al. |
| 2010/0263022 A1 | 10/2010 | Wynn et al. |
| 2011/0138074 A1 | 6/2011 | Onda et al. |
| 2011/0314149 A1 | 12/2011 | Manning et al. |
| 2013/0262651 A1* | 10/2013 | Shah et al. .................. 709/224 |

* cited by examiner

SYSTEM AND METHOD FOR MAINTAINING CAPTIVE PORTAL USER AUTHENTICATION

RELATED APPLICATIONS

This application claims the benefit of priority on U.S. Provisional Patent Application 61/732,829, filed Dec. 3, 2012, the entire contents of which are incorporated by reference.

Related patent applications to the subject application include the following: (1) U.S. Patent Application entitled "System and Method for Achieving Enhanced Performance with Multiple Networking Central Processing Unit (CPU) Cores" by Janakiraman, et al., U.S. application Ser. No. 13/692,622, filed Dec. 3, 2012; (2) U.S. Patent Application entitled "Ingress Traffic Classification and Prioritization with Dynamic Load Balancing" by Janakiraman, et al., U.S. application Ser. No. 13/692,608, filed Dec. 3, 2012; (3) U.S. Patent Application entitled "Method and System for Maintaining Derived Data Sets" by Gopalasetty, et al., U.S. application Ser. No. 13/692,920, filed Dec. 3, 2012; (4) U.S. Patent Application entitled "System and Method for Message handling in a Network Device" by Palkar, et al., U.S. application Ser. No. 13/918,732, filed Jun. 14, 2013; (5) U.S. Patent Application entitled "Session-Based Forwarding" by Janakiraman, et al., U.S. application Ser. No. 13/918,748, filed Jun. 14, 2013; (6) U.S. Patent Application entitled "Rate Limiting Mechanism Based on Device Load/Capacity or Traffic Content" by Nambiar, et al., U.S. application Ser. No. 13/918,760, filed Jun. 14, 2013; (7) U.S. Patent Application entitled "Control Plane Protection for Various Tables Using Storm Prevention Entries" by Janakiraman, et al., U.S. patent application Ser. No. 13/918,770, filed Jun. 14, 2013; (8) U.S. Patent Application entitled "Enhanced Serialization Mechanism" by Janakiraman, et al., U.S. application Ser. No. 13/928,300, filed Jun. 26, 2013. The entire contents of the above applications are incorporated herein by reference.

FIELD

The present disclosure relates to networking processing performance of a symmetric multiprocessing (SMP) network architecture. In particular, the present disclosure relates to a system and method for maintaining captive portal user authentications.

BACKGROUND

A symmetric multiprocessing (SMP) architecture generally is a multiprocessor computer architecture where two or more identical processors can connect to a single shared main memory. In the case of multi-core processors, the SMP architecture can apply to the CPU cores.

In an SMP architecture, multiple networking CPUs or CPU cores can receive and transmit network traffic to and from network clients. Generally, network authentications involve two types of authentications, e.g., layer 2 (L2) authentications or layer 3 (L3) authentications. Specifically, layer 3 authentications are typically web-based authentications; and, layer 2 authentications are, for example, Media Access Control (MAC) authentication in compliance with IEEE 802.1x standard.

In a layer 2 authentication, when a station associates with an access point, a network controller device will be notified by the access point of the station association. Moreover, the network controller device can store information about the association, such as username and/or password, in a cache. Thus, there is no user intervention required for layer 2 authentications. When a user device associates with the network, the layer 2 authentication is performed seamlessly because of the mechanism built in the system as described above.

On the other hand, when a client connects to a network using layer 3 authentications, a captive portal web page is usually displayed on the client device prompting for user credentials. Sometimes, the system may be configured to use a multi-factor authentication scheme for enhanced security, e.g., by requiring both a RSA and a password authentication. Because the network system does not have a built-in mechanism to facilitate layer 3 authentication, user interventions are typically required in this type of network client authentication. As a result, each time when a client roams from one access point to another access point in the network, the client is prompted for authentication credentials by the captive portal. Thus, it is desirable to have a scheme that allows for seamless layer 3 authentications in this scenario.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to SMP architecture performance enhancement, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking processing performance. In particular, the present disclosure relates to a system and method for maintaining captive portal user authentication. Specifically, the system maintains captive portal user authentication by determining an association status between a client and an access point in a wireless network, as well as whether to remove an entry corresponding to the client from a network layer (L3) cache based on the association status. If it is determined that the entry is to be removed, the disclosed system removes the entry corresponding to the client from the network layer (L3) cache. Note that, the association status can be determined based on one or more of an indication by a station management process at the network device, and a detection of radio link activities.

General Architecture

Figure 1:
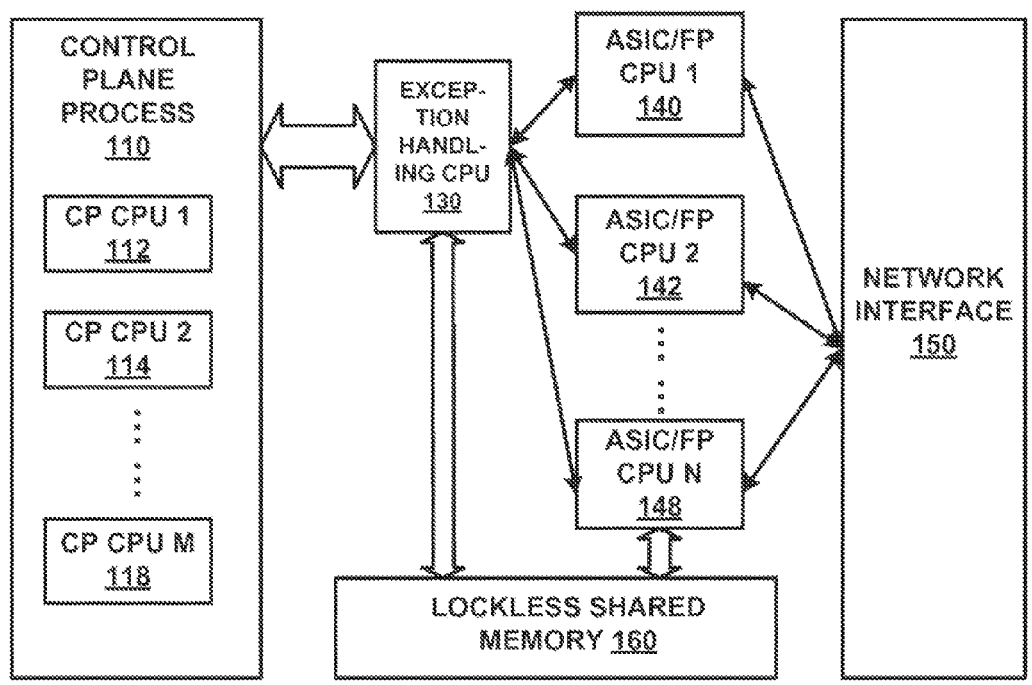
FIG. 1 illustrates an exemplary architecture at multiple processing planes according to embodiments of the present disclosure.

FIG. 1 illustrates a general architecture including multiple processing planes according to embodiments of the present disclosure. The disclosed system includes a plurality of control place processors (e.g., CP CPU1, CP CPU2, CP CPU 3, . . . CP CPU M) and a plurality of datapath processors, which include a slowpath (SP) or exception handling processor (e.g., SP CPU) and multiple fastpath (FP) or forwarding processors (e.g., FP CPU 1, FP CPU 2 . . . FP CPU N). In some embodiments, the FP processors can be replaced by multiple ASICs. The SP or exception handling processor can be a part of data plane processors or a separate CPU complex. Further, the SP or exception handling processor has the ability to program tables that are readable by the FP processors or ASICs. The disclosed system also includes a lockless shared memory that can be accessed by all datapath processors in the system.

Specifically, FIG. 1 includes at least a control plane process 110, two or more datapath processors 120, a lockless shared memory 160 accessible by the two or more datapath processors 120, and a network interface 150.

Control plane process 110 may be running on one or more CPU or CPU cores, such as CP CPU 1 112, CP CPU 2 114, . . . CP CPU M 118. Furthermore, control plane process 110 typically handles network control or management traffic generated by and/or terminated at network devices as opposed to data traffic generated and/or terminated at client devices.

According to embodiments of the present disclosure, datapath processors 120 include a single exception handling CPU 130, such as a slowpath (SP) processor and multiple fastpath (FP) processors or ASICs (e.g., ASIC/FP CPU 1 140, ASIC/FP CPU 2 142, . . . ASIC/FP CPU N 148). Only ASIC/FP processors are able to receive data packets directly from network interface 150. Exception handling processor, on the other hand, only receives data packets from ASIC/FP processors.

Lockless shared memory 160 is a flat structure that is shared by all datapath processors 120, and not tied to any particular CPU or CPUs. Any datapath processor can read any memory location within lockless shared memory 160. Therefore, both the single exception handling processor 130 and the multiple ASIC/FP processors (e.g., ASIC/FP CPU 1 140, ASIC/FP CPU 2 142, . . . ASIC/FP CPU N 148) have read access to lockless shared memory 160, but, besides write access to update timestamps by the multiple ASIC/FP processors, only the single exception handling processor 130 has write access to lockless shared memory 160. More specifically, any datapath processor can have access to any location in lockless shared memory 160 in the disclosed system.

Also, control plane process 110 is communicatively coupled to exception handling CPU 130, but not ASIC or fastpath (FP) processors (e.g., ASIC/FP CPU 1 140, ASIC/FP CPU 2 142, . . . ASIC/FP CPU N 148). Thus, whenever control plane process 110 needs information from datapath processors 120, control plane process 110 will communicate with exception handling processor 130.

Network Forwarding Pipeline Process

Figure 2:
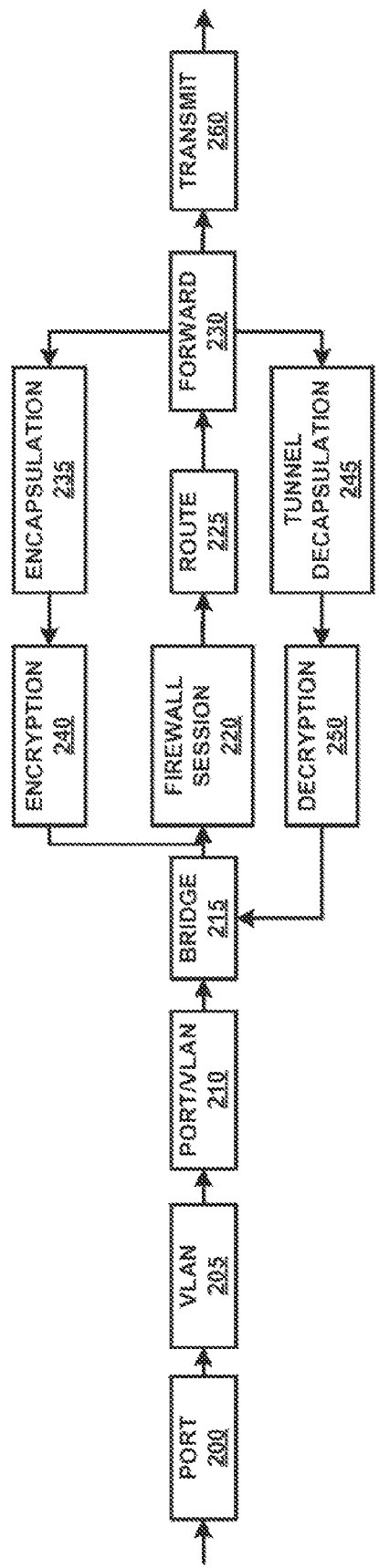
FIG. 2 illustrates an exemplary network forwarding pipeline process according to embodiments of the present disclosure.

FIG. 2 illustrates an exemplary network forwarding pipeline process according to embodiments of the present disclosure. A typical network forwarding pipeline process at a FP processor involves one or more of the following operations:

Port lookup;
VLAN lookup;
Port-VLAN table lookup;
Bridge table lookup;
Firewall session table lookup;
Route table lookup;
Packet encapsulation;
Packet encryption;
Packet decryption;
Tunnel de-capsulation; and/or
Forwarding; etc.

In a typical FP processor's pipeline process as illustrated in FIG. 2, for each ingress packet, the packet will pass through one or more of the following processing steps: a port lookup, a VLAN lookup, a port/VLAN lookup, a bridge lookup, a firewall session lookup, a route table or route cache lookup, forwarding table lookup, etc. In some embodiments, before the packet is transmitted, the packet will go through encapsulation and/or encryption process. If it's a L2 packet, the packet will go through bridge table lookup after encryption and continue with the process flow. On the other hand, if it's a L3 packet, the packet will go through firewall session lookup and continue with the process flow. In some embodiments, for example when an ingress packet is received via a GRE tunnel, the packet will go through a tunnel de-capsulation and/or decryption process. If it's a L2 packet, the packet will go through bridge table lookup after encryption and continue with the process flow. Note that, the L2 packets will be going through steps such as firewall session processing because the disclosed system is capable of performing L3/L4 policy enforcement, Deep Packet Inspection (DPI), etc., for even L2 bridge traffic.

Thus, the network forwarding process illustrated in FIG. 2 includes at least a port lookup operation 200, a virtual local area network (VLAN) lookup operation 205, a port/VLAN lookup operation 210, a bridge lookup operation 215, a firewall session lookup operation 220, a route lookup operation 225, a forward lookup operation 230, an encapsulation operation 235, an encryption operation 240, a tunnel de-capsulation operation 245, a decryption operation 250, and a transmit operation 260.

Layer 3 Authentication

Figure 3:
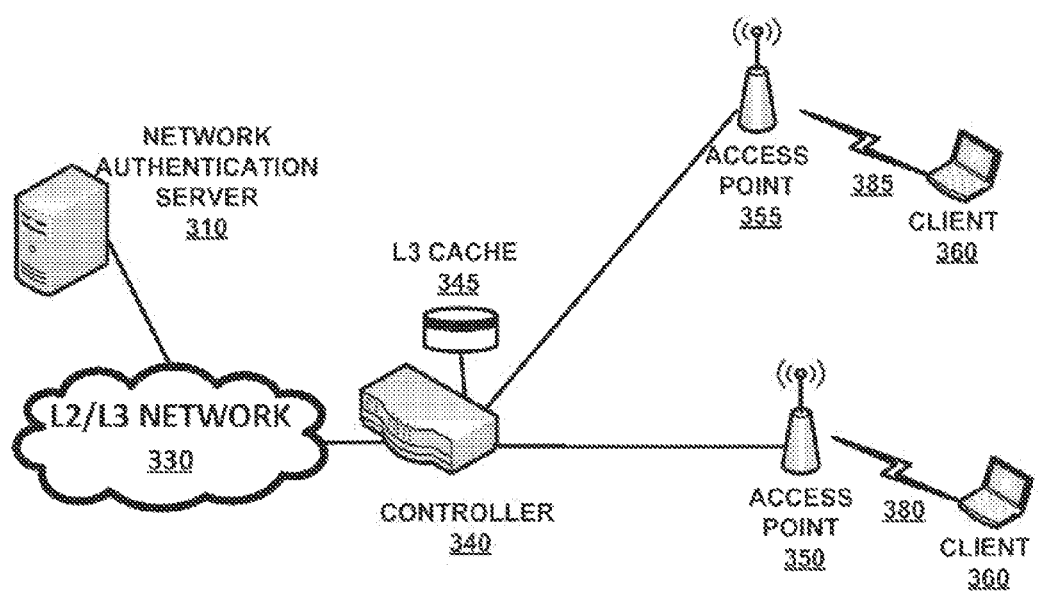
FIG. 3 is a diagram illustrating exemplary layer 3 authentications in a wireless network according to embodiments of the present disclosure.

FIG. 3 is a diagram illustrating exemplary layer 3 authentications in a wireless network. FIG. 3 includes at least a network authentication server 310, a controller 340, a plurality of access points, such as, access point 350 and access point 355, and one or more client, such as client 360. Specifically, network authentication server 340 is connected to controller 340 through L2/L3 network 330. Moreover, controller 340 is connected to a plurality of access points, such as access point 350 and access point 355. Further, one or more clients are associated with each access point. For example, client 360 is associated with access point 350 via wireless link 380 initially at time point $t_0$.

Furthermore, for illustration purposes only, assuming that client 360 subsequently roams from access point 350 to access point 355 via wireless link 385 at time point $t_1$. When client 360 was associated with access point 350 at time point $t_0$, client 360 (in the case of layer 3 authentication) was prompted with a captive portal website that requests for user credential information. The user credential information was then forwarded by access point 350 to controller 340, which is interconnected to network authentication server 310 through L2/L3 network 330. Note that, controller 340 also has access to a layer 3 cache L3 cache 345, which can be either built-in as an internal module of controller 340 or an external device connected to controller 340.

Controller 340 checks L3 cache 345 to determine whether a user entry corresponding to client 360 exists. If so, controller 340 authenticates or denies the user based on the user entry from L3 cache 345. The user entry generally includes a user policy, for example, a user entry may state that the user is authenticated to access the network for 3 hours. Therefore, controller 340 will allow client 360's access to network within the 3-hour time period and deny client 360's access to network after 3 hours. Because the total number of users supported by a high performance scalable network is very large yet the storage of L3 cache 345 is finite, user entries in L3 cache 345 are deleted from after a predetermined period of time since their latest access respectively.

Hence, if client 360 has been idle for a long period of time, which can happen during client 360's roaming from access point 350 to access point 355, its corresponding user entry has been deleted after the predetermined period of time. If controller 340 cannot find a corresponding user entry in L3 cache 345 for client 360, controller 340 will redirect client 360 to captive portal page to re-enter the user credential information for network authentication.

When controller 340 receives the user credential information of client 360 from access point 350, controller 340 sends the client information and the user credential information to network authentication server 310 via L2/L3 network 330, and retrieves a user policy for client 360. Then, controller 340 stores the retrieved user policy as a new user entry in L3 cache 345, and responds to client 360's network access request based on the user policy.

As mentioned above, when a L3 client roams between different access points, the client may experience longer than normal idle time, causing its user entry in L3 cache 345 to be deleted before the L3 client is active again. One solution to the problem is to increase the predetermined period of time after which the user entry is deleted, for example, to 60 minutes rather than 5 minutes.

According to embodiments of the present disclosure, whether a user entry corresponding to client 360 in L3 cache 345 gets deleted depends on the status of the radio link that client 360 is on. Therefore, as long as client 360 is associated with an access point, then the user entry corresponding to client 360 should not be deleted.

Accordingly, the disclosed system will maintain two different timeout values—the first timeout value or a station timeout value (which is typically set to a longer period) is for the period of time of the association between the client and the access point; and, the second timeout value or a user timeout value (which is typically set to a shorter period) is for the traffic to or from the client on the radio link. For example, the system may configure 15 minutes to be the station timeout value that indicates the maximum period of time before the user entry gets deleted if the station has been idle, i.e., there has been no traffic to or from a client on the radio link between the client and an access point. On the other hand, the system may configure 5 minutes to be the user timeout value that indicates the maximum period of time before a user entry gets deleted if the user has been idle.

Note that, only controller 340 has access to information regarding whether client 360 has been idle, and if so, for how long. The access points in the network, such as access point 350 and access point 355, have no visibility to whether a specific client is associated with the network. Thus, it is possible that an access point may deem the client as alive even though the client has been idle for 5 minutes. Hence, the access point may continue communicating network packets, e.g., compliant with IEEE 802.1x, with the client. However, those network packets are not client traffic and are not transmitted to the controller.

Scalable User Entry Age Out Scheme

In a high performance system, when a large number of clients send a large number of authentication requests to the network at the same time, if the user entry age out mechanism is based on a predetermined period of time, then a large number of user entries will be deleted from the L3 cache at the same time. However, as mentioned before, this mechanism may result in deletion of user entries corresponding to users that have been idle but nonetheless still associated with the network. Those users would have to be going through the layer 3 authentication process all over again, which involves a number of communication exchanges between client and access point, access point and controller, controller and authentication server, etc. These communication exchanges may generate an unnecessary network traffic load, which would be avoided if those associated users/clients can be identified and their corresponding user entries can be preserved in the L3 cache.

Specifically, in order to identify users that are associated with the network, when a timeout value (e.g., the first timeout value/the station timeout value, or the second timeout value/the user timeout value) is reached, the system send out pings to the client for a number of times. If a response to the ping is received from the client within a predetermined time interval, then the system will keep the user and/or station entry in the L3 cache. If no response is received from the client within the predetermined time interval, the system will retry the pings for a number of times. Similarly, if a response to the retry messages is received from the client within the predetermined time interval, then the system will keep the user and/or station entry in the L3 cache. However, if after a few retries, the system fails to receive a response from the client, the user entry will be deleted from the L3 cache.

It shall be noted that, the pings to the client facilitate determination of which clients are idle or in a hibernating state and which clients have been disassociated with the network. Moreover, in a highly scalable system, the retry mechanism has a cascading effect on the user entry age out. Thus, it helps to avoid a large number of user entries get deleted from the L3 cache at the same time and spread out the temporal user entry maintenance load of the system, because some clients may response to the ping earlier while others may respond after a few retries.

In other embodiments, a station management process (e.g., STM process) executing on controller 340 maintains status of all stations. Typically, the station management process (e.g., STM process) maintains the state of client associations. Specifically, the station management process maintains a list of access points in the network, clients in the network, which client is associated with which access point, etc. Also, the station management process can determine whether a specific client, e.g., client 360, is currently associated or disassociated with the network. In some embodiments, the station entries can be maintained in data path instead of control path.

If the station management process determines that the client has been disassociated with the network, the system will not send the pings to the client when no response is received from the client within the predetermined time interval. Because if the client is known to have been disassociated with the network, the client is not expected to respond to the pings and thus there is no need to ping the client. In other word, the need for pinging a client arises only when the client is in an idle state but still associated with the network.

In some deployment scenarios, a firewall may be configured between a controller (e.g., controller 340) and a client (e.g., client 360). The firewall may deny or block the pings to the client, which causes failure of the controller to receive a response to the pings from the client. However, because the controller may not be able to distinguish lack of response from the client due to firewall block, packet loss, disassociation, or any other reasons, the controller will typically retry the pings for a few times. On the one hand, these retry messages generate unnecessary network traffic, because they will not be successfully delivered to the client due to the firewall block. On the other hand, the lack of response from the client due to firewall block may lead the system erroneously to deem the client as being disconnected erroneously, even though the client is still associated with the network. As a result, if a user that has been authenticated through a L3 authentication is idle in a network with a firewall configured, the user will likely need to go through L3 authentication again. This problem would be avoided if the system chooses to rely on the process (e.g., STM process) on the controller to determine whether a client is associated or disassociated without sending pings to the client.

In another use case scenario, a client is associated with the network after a successful layer 3 authentication through a captive portal web page. Subsequently, the client has been disassociated with the network after a period of idling, for example, due to moving from one corporate building to a different corporate building. Shortly after disassociating from the network, the client attempts to access the network resources again. In this scenario, it would be efficient and convenient if the client does not need to go through the layer 3 authentication again when the user re-associates with the network shortly after being disassociated. Therefore, the system may be configured to remove the user entry from the L3 cache after the user has been disassociated with the network (as determined by the process executing on the controller and maintaining station status) for at least a predetermined period of time. Thus, so long as the client attempts to re-associate with the network within the predetermined period of time, the client's user credential information would still exist as a part of the client's user entry in the L3 cache. Therefore, the client will not be prompted with the captive portal authentication page. In some embodiments, the predetermined period of time that the user entry will be cached after the corresponding client's disassociation with the network is determined based on a user profile, which may include but is not limited to, a user's roaming pattern, network usage, etc.

In summary, layer 3 authentications need certain levels of caching of user status at the controller in a network. Therefore, when a user roams in a layer 3 network, the user will not need to be authenticated again. Moreover, for a user entry in the data path to remain in the cache, the user needs to be active; for a station entry to remain in the cache, the station needs to be associated with the network or sending IEEE 802.11 packets. Techniques described in the present disclosure determines whether to remove a user entry or station entry in the L3 cache based on the association status of the corresponding client as indicated by a station management process on the controller or by detection of actual radio link activities, e.g., the client's response message to the pings.

Processes for Maintaining Captive Portal User Authentication

Figure 4A:
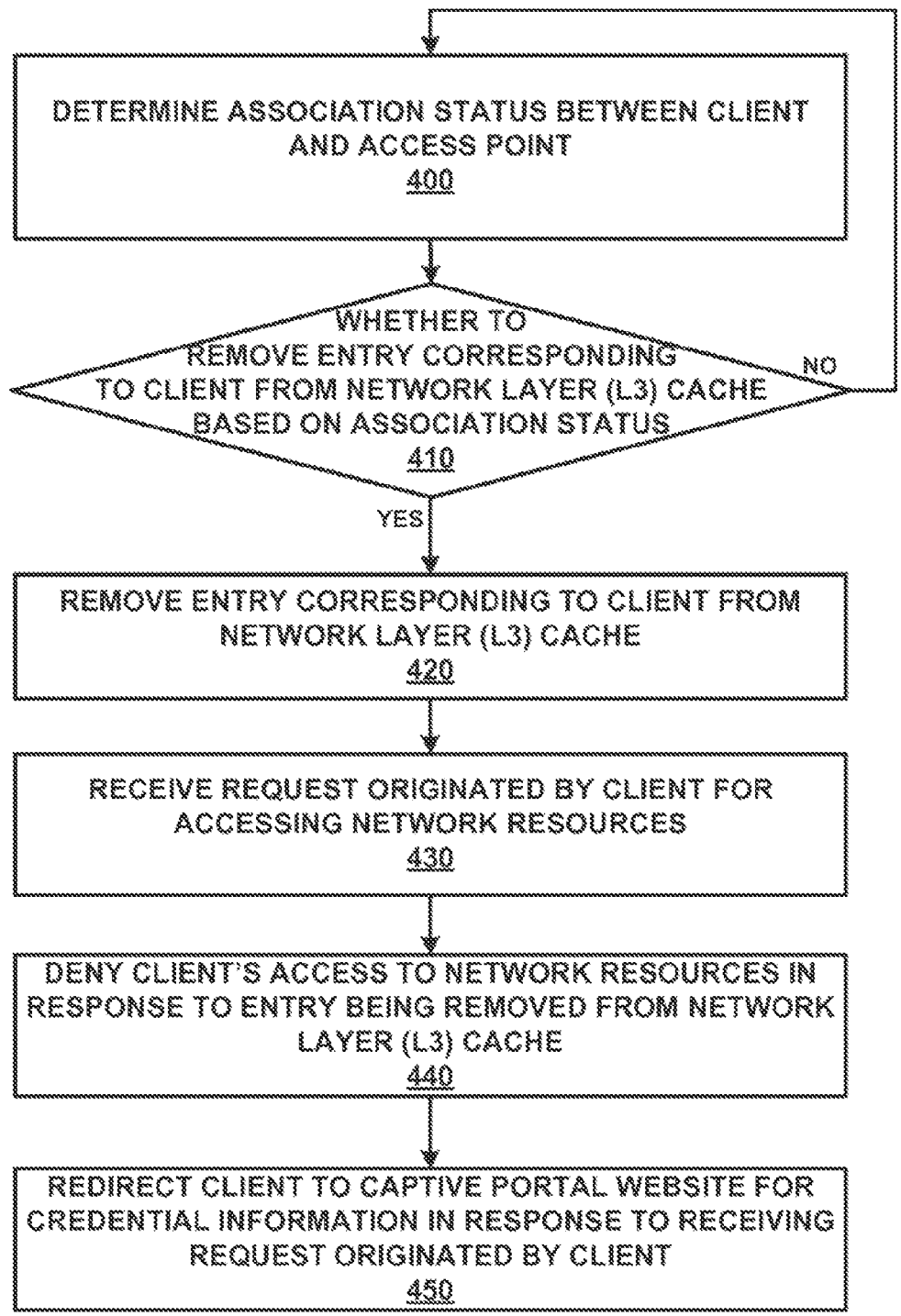
FIGS. 4A-4B are flowcharts illustrating exemplary processes for maintaining captive portal user authentication according to embodiments of the present disclosure.
Figure 4B:
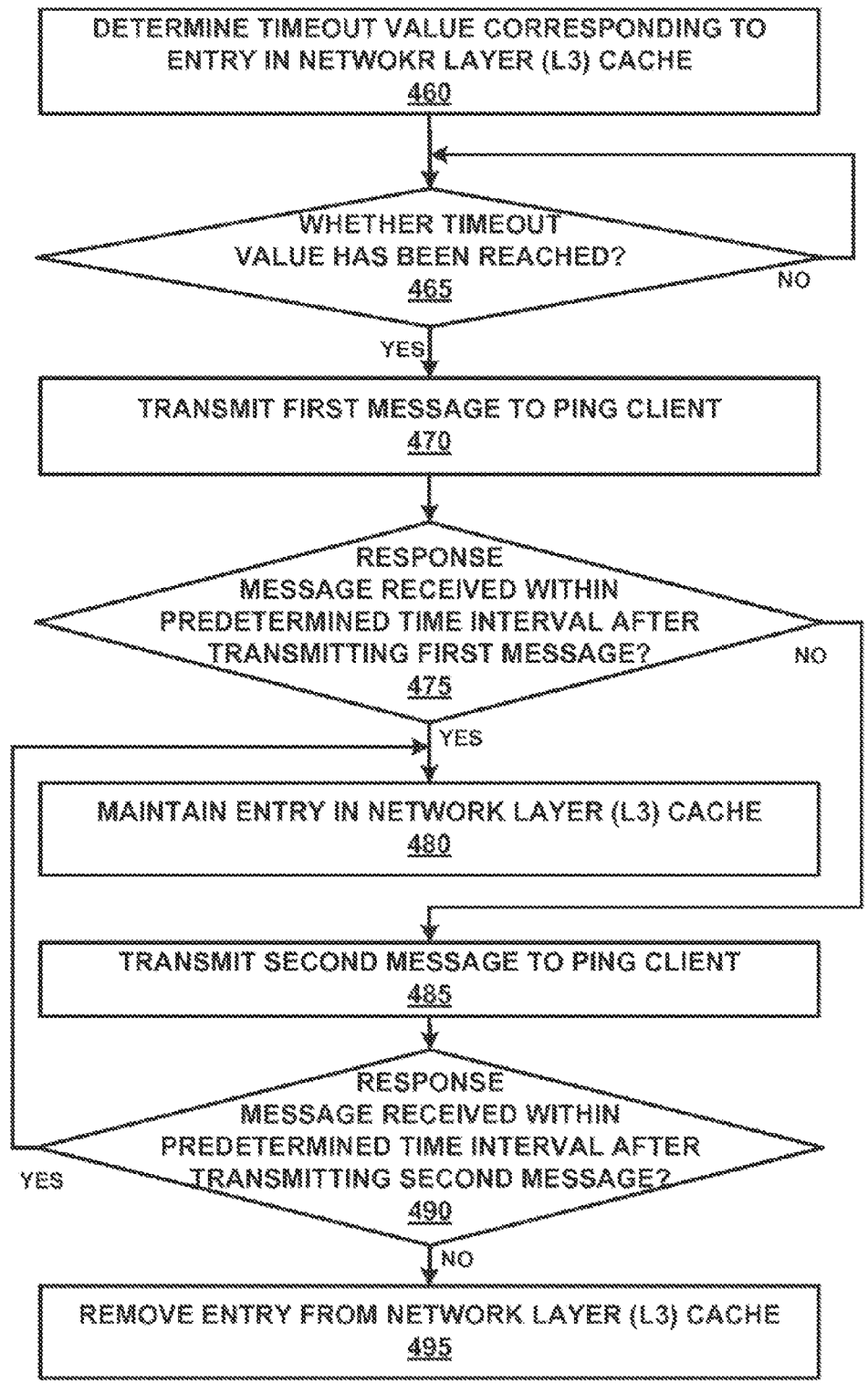

FIGS. 4A-4B are flowcharts illustrating exemplary processes for captive portal user authentication. During operations, the disclosed system determines an association status between a station and an access point (operation 400). Furthermore, the disclosed system determines whether to remove an entry corresponding to the client from a network layer (L3) cache based on the association status (operation 410). If so, the system removes the entry corresponding to the client from the network layer (L3) cache (operation 420).

Subsequently, the disclosed system may receive a request originated by the client for accessing network resources (operation 430). Then, the disclosed system will deny the client's access to the network resources in response to the entry corresponding to the client being removed from the network layer (L3) cache (operation 440). Moreover, the disclosed system will redirect the client to a captive portal website for credential information in response to receiving the request originated by the client (operation 450).

Specifically, FIG. 4B illustrates process for determining whether to remove entry corresponding to a client from the network layer (L3) cache. During operations, the disclosed system determines a timeout value corresponding to the entry in the network layer (L3) cache (operation 460). Next, the disclosed system determines whether the timeout value has been reached (operation 465). If so, the disclosed system transmits a first message to ping the client (operation 470). Then, the disclosed system determines whether a response message has been received within a predetermined time interval after transmitting first message (operation 475). If a response message was received, the disclosed system will maintain the entry in the network layer (L3) cache (operation 480). Otherwise, the disclosed system transmits a second message to ping the client (operation 485). The system will then determine whether a response message has been received within the predetermined time interval after transmitting the second message (operation 490). If so, the system will maintain the entry in the network layer (L3) cache (operation 480). If not, the system will remove the entry from the network layer (L3) cache (operation 495).

System for Maintaining Captive Portal User Authentication

Figure 5:
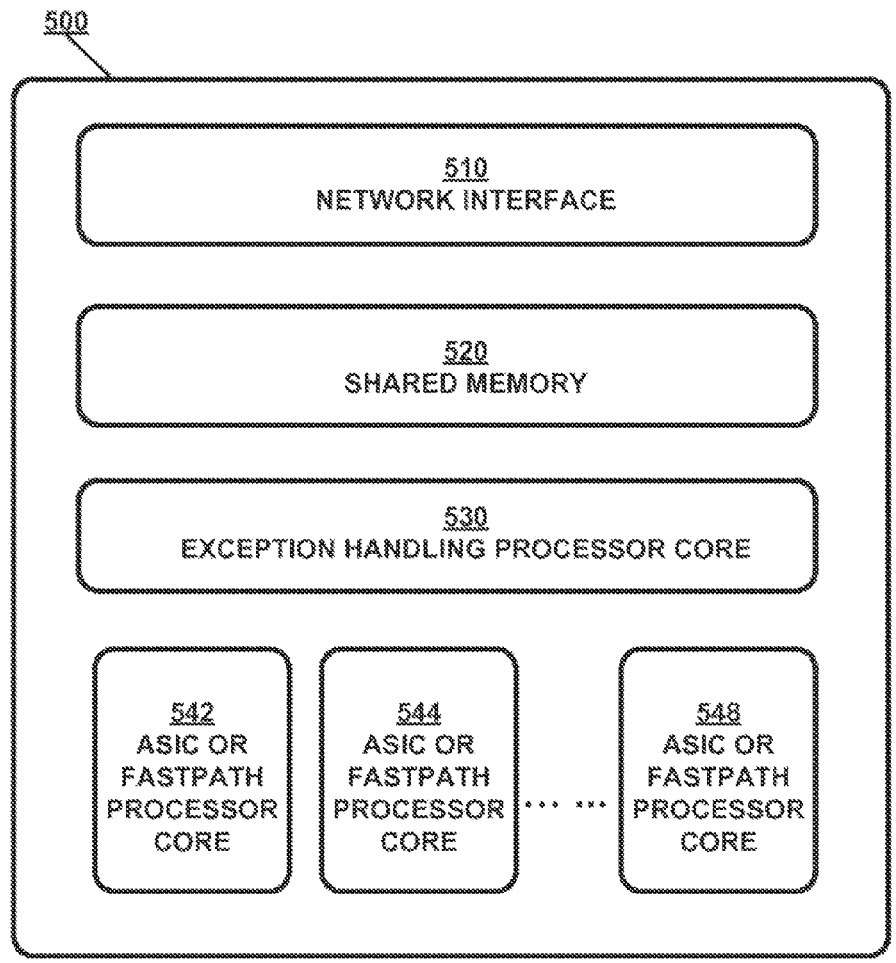
FIG. 5 is a block diagram illustrating an exemplary system for maintaining captive portal user authentication according to embodiments of the present disclosure.

FIG. 5 is a block diagram illustrating a network device system for maintaining captive portal user authentication according to embodiments of the present disclosure. Network device 500 includes at least a network interface 510 capable of communicating to a wired network, a shared memory 520 capable of storing data, a slowpath processor core 530 capable of processing network data packets, and one or more ASICs or fastpath processor cores, including ASIC/fastpath processor core 542, ASIC/fastpath processor core 544, . . . , ASIC/fastpath processor core 548, which are capable of processing network data packets. Moreover, network device 500 may be used as a network switch, network router, network controller, network server, etc. Further network device 500 may serve as a node in a distributed or a cloud computing environment.

Network interface 510 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 510 may be software-defined and programmable, for example, via an Application Programming Interface (API), and thus allowing for remote control of the network device 500.

Shared memory 520 can include storage components, such as, Dynamic Random Access Memory (DRAM), Static Random Access Memory (SRAM), etc. In some embodiments, shared memory 520 is a flat structure that is shared by all datapath processors (including, e.g., exception handling processor core 530, ASIC/fastpath processor core 542, ASIC/fastpath processor core 544, . . . , ASIC/fastpath processor core 548, etc.), and not tied to any particular CPU or CPU cores. Any datapath processor can read any memory location within shared memory 520. Shared memory 520 can be used to store various tables, lists and/or queues to facilitate maintaining captive portal user authentication described herein. For example, the tables may include, but are not limited to, a user table, a station table, a bridge table, a session table, a tunnel table, a route table and/or route cache, etc. It is important to note that any datapath processor can have access to any location in lockless shared memory in network device 500.

Exception handling processor core 530 typically includes a networking processor core that is capable of processing network data traffic. Exception handling processor core 530 is a designated CPU core assigned per ASIC/fastpast CPU core that typically handles table managements and exceptions, such as missed entry in the tables. Note that, exception handling processor core 530 only receives data packets from one or more ASIC/fastpath processor cores, such as ASIC/fastpath processor core 542, ASIC/fastpath processor core 544, ..., ASIC/fastpath processor core 548. In other words, exception handling processor core 530 does not receive data packets directly from any line cards or network interfaces. Only the plurality of fastpath processor cores can send data packets to exception handling processor core 530.

ASICs/fastpath processor cores 542-548 also include networking processor cores that are capable of processing network data traffic. However, by definition, ASICs/fastpath processor cores 542-548 only performs "fast" packet processing. Thus, ASICs/fastpath processor cores 542-548 do not block themselves and wait for other components or modules during the processing of network packets. Any packets requiring special handling or wait by a processor core will be handed over by ASIC/fastpath processor cores 542-548 to exception handling processor core 530.

Each of ASIC/fastpath processor cores 542-548 maintains one or more counters. The counters are defined as a regular data type, for example, unsigned integer, unsigned long, etc., in lieu of an atomic data type. When a ASIC/fastpath processor core 542-548 receives a packet, it may increment or decrement the values of the counters to reflect network traffic information, including but not limited to, the number of received frames, the number of received bytes, error conditions and/or error counts, etc. A typical pipeline process at ASIC/fastpath processor cores 542-548 includes one or more of: port lookup; VLAN lookup; port-VLAN table lookup; bridge table lookup; firewall session table lookup; route table lookup; packet encapsulation; packet encryption; packet decryption; tunnel de-capsulation; forwarding; etc.

According to embodiments of the present disclosure, network services provided by network device 500, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer implemented method, comprising:
    determining, by a network device connected to a network, an association status between a client and a wireless access point, wherein the wireless access point provides network resources to clients;
    determining that an entry in a network layer (L3) cache corresponding to the client is to be removed from the network layer (L3) cache, wherein determining includes using the association status;
    removing the entry corresponding to the client in the network layer (L3) cache;
    receiving a request for accessing network resources, wherein the request is associated with the client;
    denying the request for accessing network resources, wherein denying includes determining that the entry corresponding to the client has been removed from the network layer (L3) cache; and
    redirecting the client to a captive portal website, wherein a captive portal website requests client credential information.

2. The method of claim 1, wherein the entry is associated with a policy, and wherein the policy identifies whether the client is authenticated or is to be denied access to network resources.

3. The method of claim 1, wherein determining the association status includes identifying an association status indication corresponding to the client, wherein identifying is performed by a station management process of the network device.

4. The method of claim 3, wherein identifying the association status indication includes receiving a notification that the client has been disassociated from the network.

5. The method of claim 1, wherein determining the association status includes detecting radio link activities corresponding to the client.

6. The method of claim 1, further comprising:
    determining a timeout value corresponding to the entry in the network layer (L3) cache;
    determining that a time period corresponding to the timeout value has elapsed;
    transmitting a ping message, wherein receiving a ping message at a client causes the client to generate a ping response;
    receiving a ping response within a predetermined time interval after transmitting the ping message, wherein the ping response corresponds to the client; and
    maintaining the entry in the network layer (L3) cache.

7. The method of claim 1, wherein determining that the entry in the network layer (L3) cache corresponding to the client is to be removed includes:
    determining a timeout value corresponding to the entry in the network layer (L3) cache;
    determining that a time period corresponding to the timeout value has elapsed;
    transmitting a ping message, wherein receiving a ping message at a client causes the client to generate a ping response; and
    receiving no ping response within a predetermined time interval after transmitting the ping message.

8. A system comprising:
    one or more processors; and
    a non-transitory computer readable storage medium communicatively coupled to the one or more processors, wherein the non-transitory computer readable storage medium includes instructions that, when executed by the one or more processors, cause the one or more processors to perform operations including:
        determining, by a network device connected to a network, an association status between a client and a wireless access point, wherein the wireless access point provides network resources to clients;
        determining that an entry in a network layer (L3) cache corresponding to the client is to be removed from the network layer (L3) cache, wherein determining includes using the association status;
        removing the entry corresponding to the client in the network layer (L3) cache;
        receiving a request for accessing network resources, wherein the request is associated with the client;
        denying the request for accessing network resources, wherein denying includes determining that the entry corresponding to the client has been removed from the network layer (L3) cache; and
        redirecting the client to a captive portal website, wherein a captive portal website requests client credential information.

9. The system of claim 8, wherein the entry is associated with a policy, and wherein the policy identifies whether the client is authenticated or is to be denied access to network resources.

10. The system of claim 8, wherein determining the association status includes identifying an association status indication corresponding to the client, wherein identifying is performed by a station management process of the network device.

11. The system of claim 10, wherein identifying the association status indication includes receiving a notification that the client has been disassociated from the network.

12. The system of claim 8, wherein determining the association status includes detecting radio link activities corresponding to the client.

13. The system of claim 8, wherein the operations further include:
    determining a timeout value corresponding to the entry in the network layer (L3) cache;
    determining that a time period corresponding to the timeout value has elapsed;
    transmitting a ping message, wherein receiving a ping message at a client causes the client to generate a ping response;

receiving a ping response within a predetermined time interval after transmitting the ping message, wherein the ping response corresponds to the client; and maintaining the entry in the network layer (L3) cache.

14. The system of claim 8, wherein determining that the entry in the network layer (L3) cache corresponding to the client is to be removed includes:

determining a timeout value corresponding to the entry in the network layer (L3) cache;

determining that a time period corresponding to the timeout value has elapsed;

transmitting a ping message, wherein receiving a ping message at a client causes the client to generate a ping response; and receiving no ping response within a predetermined time interval after transmitting the ping message.

15. A non-transitory computer readable medium comprising instructions that, when executed by one or more processors, cause the one or more processors to perform operations including:

determining, by a network device connected to a network, an association status between a client and a wireless access point, wherein the wireless access point provides network resources to clients;

determining that an entry in a network layer (L3) cache corresponding to the client is to be removed from the network layer (L3) cache, wherein determining includes using the association status;

removing the entry corresponding to the client in the network layer (L3) cache;

receiving a request for accessing network resources, wherein the request is associated with the client;

denying the request for accessing network resources, wherein denying includes determining that the entry corresponding to the client has been removed from the network layer (L3) cache; and redirecting the client to a captive portal website, wherein a captive portal website requests client credential information.

16. The non-transitory computer readable medium of claim 15, wherein the entry is associated with a policy, and wherein the policy identifies whether the client is authenticated or is to be denied access to network resources.

17. The non-transitory computer readable medium of claim 15, wherein determining the association status includes identifying an association status indication corresponding to the client, wherein identifying is performed by a station management process of the network device.

18. The non-transitory computer readable medium of claim 17, wherein identifying the association status indication includes receiving a notification that the client has been disassociated from the network.

19. The non-transitory computer readable medium of claim 15, wherein determining the association status includes detecting radio link activities corresponding to the client.

20. The non-transitory computer readable medium of claim 15, further comprising instructions that, when executed by the one or more processors, cause the one or more processors to perform operations including:

determining a timeout value corresponding to the entry in the network layer (L3) cache;

determining that a time period corresponding to the timeout value has elapsed;

transmitting a ping message, wherein receiving a ping message at a client causes the client to generate a ping response;

receiving a ping response within a predetermined time interval after transmitting the ping message, wherein the ping response corresponds to the client; and maintaining the entry in the network layer (L3) cache.

21. The non-transitory computer readable medium of claim 15, wherein determining that the entry in the network layer (L3) cache corresponding to the client is to be removed includes:

determining a timeout value corresponding to the entry in the network layer (L3) cache;

determining that a time period corresponding to the timeout value has elapsed;

transmitting a ping message, wherein receiving a ping message at a client causes the client to generate a ping response; and receiving no ping response within a predetermined time interval after transmitting the ping message.

* * * * *